United States Patent
Shiohara

(10) Patent No.: US 6,822,754 B1
(45) Date of Patent: Nov. 23, 2004

(54) PRINT DATA GENERATION SYSTEM AND CORRESPONDING METHOD FOR USE WITH A PRINTING SYSTEM

(75) Inventor: Susumu Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/093,774

(22) Filed: Jun. 9, 1998

(30) Foreign Application Priority Data

Jun. 9, 1997 (JP) .............................................. 9-151411

(51) Int. Cl.[7] .......................... G06K 15/00; G06F 13/00
(52) U.S. Cl. .................... 358/1.15; 358/1.13; 358/1.14; 358/403; 709/200; 709/201; 709/217
(58) Field of Search ................. 358/1.1–1.9, 1.11–1.18, 358/401, 403, 296; 709/201, 217, 227–232, 237, 238, 329, 200

(56) References Cited

U.S. PATENT DOCUMENTS

| 5,287,194 | A | * | 2/1994 | Lobiondo | 358/296 |
| 5,287,434 | A | * | 2/1994 | Bain et al. | 358/1.15 |
| 5,579,447 | A | * | 11/1996 | Salgado | 358/1.15 |
| 5,638,511 | A | * | 6/1997 | Nezu | 713/201 |
| 5,727,135 | A | * | 3/1998 | Webb et al. | 358/1.15 |
| 5,754,744 | A | * | 5/1998 | Matsumoto et al. | 358/1.14 |
| 5,774,356 | A | * | 6/1998 | Hisatake et al. | 700/28 |
| 5,819,015 | A | * | 10/1998 | Martin et al. | 358/1.15 |
| 5,859,711 | A | * | 1/1999 | Barry et al. | 358/1.15 |
| 6,031,975 | A | * | 2/2000 | Iijima | 358/1.15 |

FOREIGN PATENT DOCUMENTS

EP 0 687 972 12/1995

* cited by examiner

Primary Examiner—King Y. Poon
(74) Attorney, Agent, or Firm—Sughrue Mion, PLLC

(57) ABSTRACT

A system and corresponding method for selecting an appropriate printer or printers from among printers connected to a network to improve printing efficiency is provided. Upon receipt of a print command, a print data generation system issues a temporary print request to at least one of the printers, which in response issue acceptance information to the print data generation system. The print data generation system then issues a print processing information request to obtain print processing information from the printers. The print data generation system then selects a printer or printer based on the print processing information, and generates print data for printing by the selected printer or printers.

27 Claims, 9 Drawing Sheets

FIG. 4

39: PRINT JOB MANAGEMENT TABLE

| PRINT JOB | ADDRESS | COMMAND SYSTEM | PRINT PAGES | PAPER SIZE | COLOR | DETERMINATION FLAG |
|---|---|---|---|---|---|---|
| 06 | ADR3 | type2 | PN6 | A4 | | 0 |
| 05 | ADR2 | type1 | PN5 | A4 | | 1 |
| 04 | ADR1 | type1 | PN4 | A4 | | 1 |
| 03 | ADR4 | type1 | PN3 | A4 | | 1 |
| 02 | ADR2 | type3 | PN2 | B4 | | 1 |
| 01 | ADR1 | type1 | PN1 | A4 | | 1 |

40: PRINT PROCESSING INFORMATION MANAGEMENT TABLE

| TOTAL NUMBER OF UNPROCESSED PAGES | PRINTING SPEED | CONTEXT SWITCH TIMES | CHANGE TIME | NUMBER OF UNPROCESSED JOBS | PRINTER STATE |
|---|---|---|---|---|---|
| PN | PS | CSN | TC | JN | |

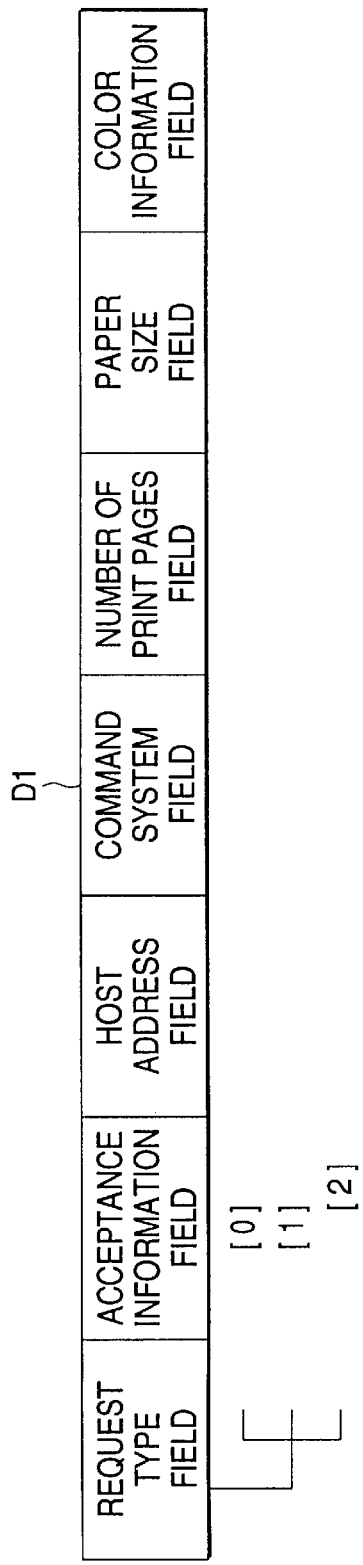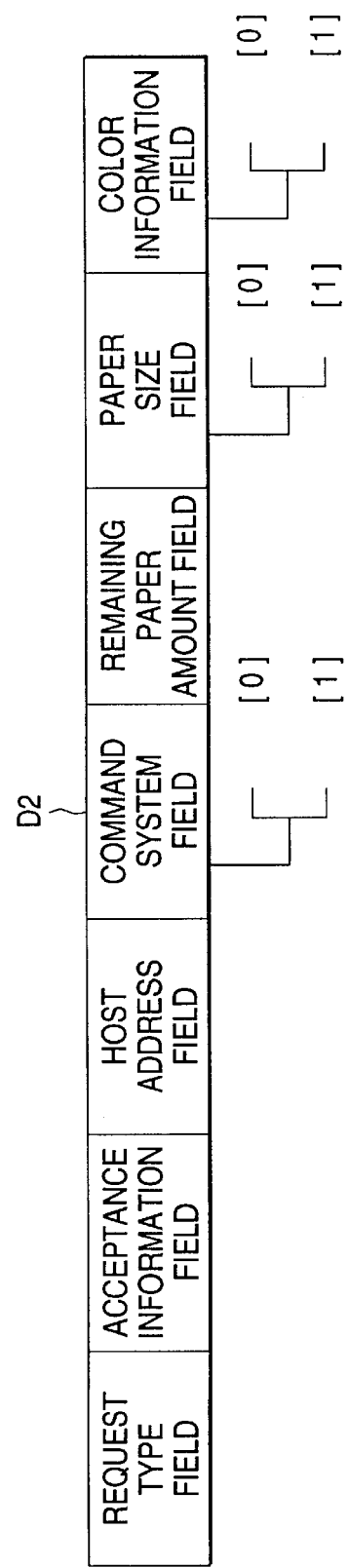

PRINT DATA GENERATION SYSTEM AND CORRESPONDING METHOD FOR USE WITH A PRINTING SYSTEM

This request for Continued Examination (RCE) of application Ser. No. 09/093,774 filed Jun. 9, 1998; the disclosure of which is incorporated herein by reference.

BACKGROUND OF THE INVENTION

1. Field of the Invention

The present invention relates to a system and corresponding method for generating print data to be printed by any of a plurality of printers in a printing network that is configured, for example, as local area network (LAN). More particularly, the present invention relates to a system for selecting a printer or printers at which the printing data is to be printed based on characteristics of the printers, such that the printer selection is made prior to generating the print data.

2. Description of the Related Art

Printing networks are known which comprise a plurality of printers and a plurality of host computers connected by a network, such as a LAN, so that the printers can be shared. When using such a printing network to create a document, a user employs an application program, such as a document preparation software program, to prepare the text of the document, and then issues a print command.

Upon receiving the print command, the application program forwards the document data to be printed to a printer driver. The printer driver converts the document data into print data having a predetermined format, such as code readable by the printer for printing out the document, or raster data, and transmits the print data to the network through a network control section. The print data is input via the network to the printer, which then interprets the print data, expands it to printable data, and drives a print engine to thus print the document. Since the printing network described above enables a number of users to share the printers connected to the network, printing efficiency can be enhanced in comparison with an arrangement where each user uses an individual local printer.

A client-server system which is capable of assigning functions of computer resources connected to a network, and a peer-to-peer network for connecting computer resources in equal relationships, are known distributed printing systems which use a network. In the client-server system, a dedicated print server is installed on the network for managing print jobs on the network in a centralized manner. Therefore, the user can keep track of the execution state of his or her requested print job by checking the operation state of the print server.

However, this type of system incurs the additional cost of installing a machine dedicated to 25 the print server. Hence, in recent years, peer-to-peer networks that can be constructed easily have been widely used in the so-called SOHO (Small Office Home Office) market.

However, if a printing system is constructed as a peer-to-peer network, the computer resources have an equal relationship, thus making it difficult to keep track of the print load on the entire network. In recent years, a utility program which provides a network manager for monitoring the printer state on a network through the use of an SNMP (Simple Network Management Protocol) has been developed.

However, this utility program is expensive, and requires much time and effort to install. Also, this utility program does not effectively locate a printer on the network with a light print load each time printing is executed. Furthermore, if the monitoring utility program is made resident in memory, much memory is consumed.

Therefore, the known utility programs have been inadequate in enabling a user to easily determine the number of unprocessed print jobs assigned to a selected printer, and the time remaining for processing a print request. Therefore, it is difficult for a user to manage a print schedule, especially in high production business settings.

If, however, the user is able to determine that a selected printer has been assigned to print a large number of unprocessed print jobs prior to the user's print request, the user can cancel the print request assigned to the printer and select another printer. However, much time is wasted in selecting another printer. Also, in such systems, the print data generated by the printer driver is saved on a local disk. Therefore, if the print request is canceled, the saved data is also canceled. Hence, the system must again generate the print data. Accordingly, the total time for completing a desired print job increases drastically.

Therefore, a continuing need exists for a printing network capable of effectively managing print jobs.

SUMMARY OF THE INVENTION

It is therefore an object of the invention to provide a print data generation system for selecting at least one printer from a plurality of printers in a printer network in a manner which improves printing speed.

It is a further object of the invention to provide a print data generation system for selecting at least one of a plurality of printers of the printer network based on expected printing time.

These and other objects of the invention are substantially achieved by providing a printing system comprising a print data generation system for generating print data based on specified print contents, and a plurality of printers, each of which controlling drive of a respective print engine based on print data input from the print data generation system, to print the print contents on a respective print recording medium.

The print data generation system comprises a temporary print request transmitter which transmits a temporary print request to the printers, and a print processing information requestor which requests print processing information indicating a print processing state from each printer based on acceptance information input from each printer in response to the temporary print request. The print data generation system further comprises a selector which selects at least one of the printers based on the print processing information input from the printers, a print request determinator which determines the temporary print request issued to the printer if the selector selects the printer, and a print data generator which generates the print data based on the print contents if the selector selects the printer.

Each of the plurality of printers comprises a print job management table for managing each registered unprocessed print job by relating at least the number of print pages, an acceptance information issuer which issues the acceptance information to the print data generation system in response to the temporary print request, and a print processing information transmitter which detects the print processing information based on the print job management table and transmits the detected print processing information to the print data generation system if a request for the print processing information is made. Each printer further comprises a table manager which updates storage contents of the print job management table if the printer is selected for printing, and a drive control which controls the print engine based on the print data input from the print data generation system.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, of which:

FIG. 4 is a schematic representation of specific formats of a print job management table and a print processing information management table;

FIGS. 5A and 5B are schematic representations of examples of structures of data transferred between a print data generation system and a printer;

DETAILED DESCRIPTION OF THE PREFERRED EMBODIMENTS

Figure 1:
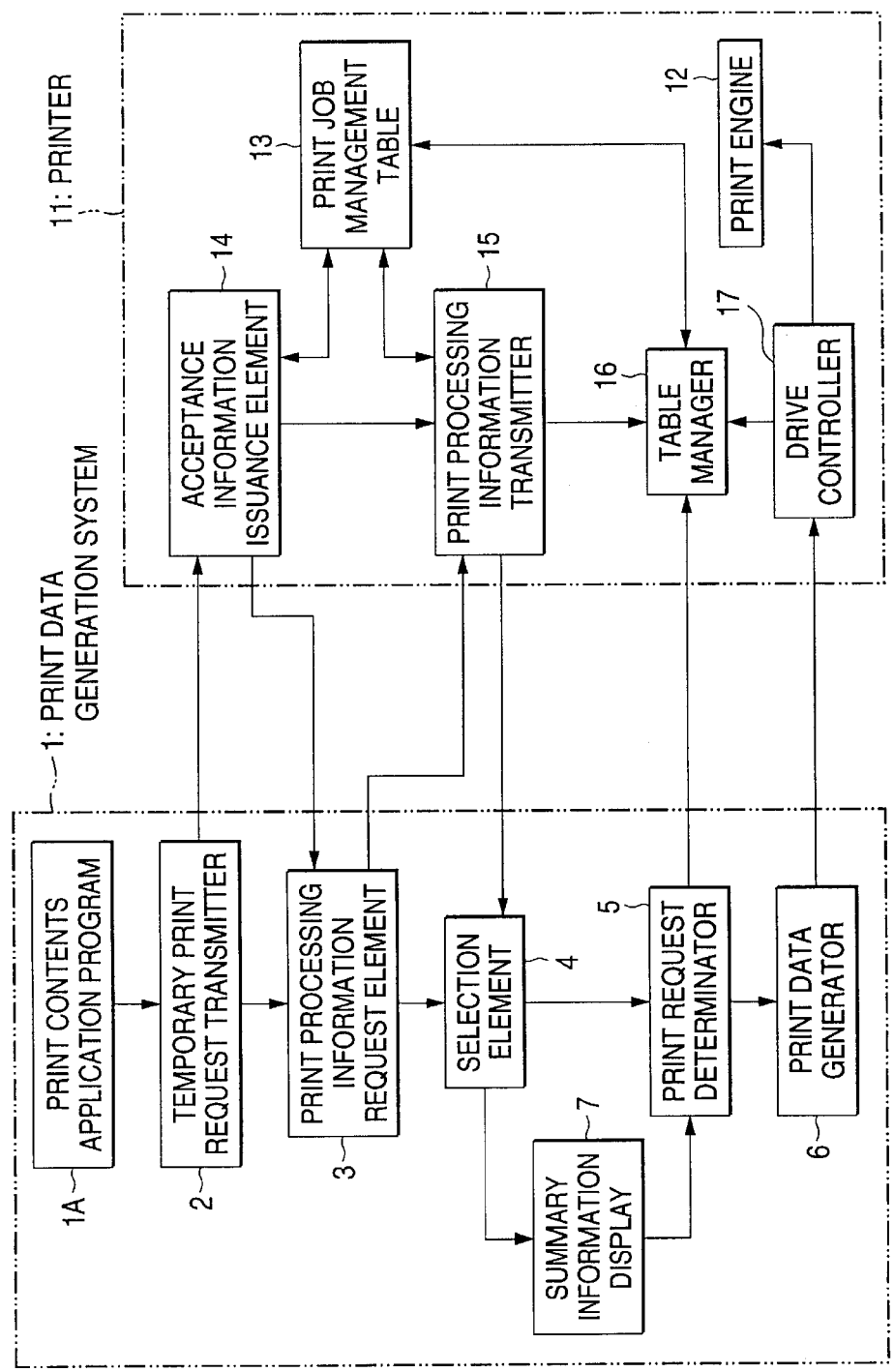
FIG. 1 is a functional block diagram illustrating an example of a system according to an embodiment of the present invention.
Figure 2:
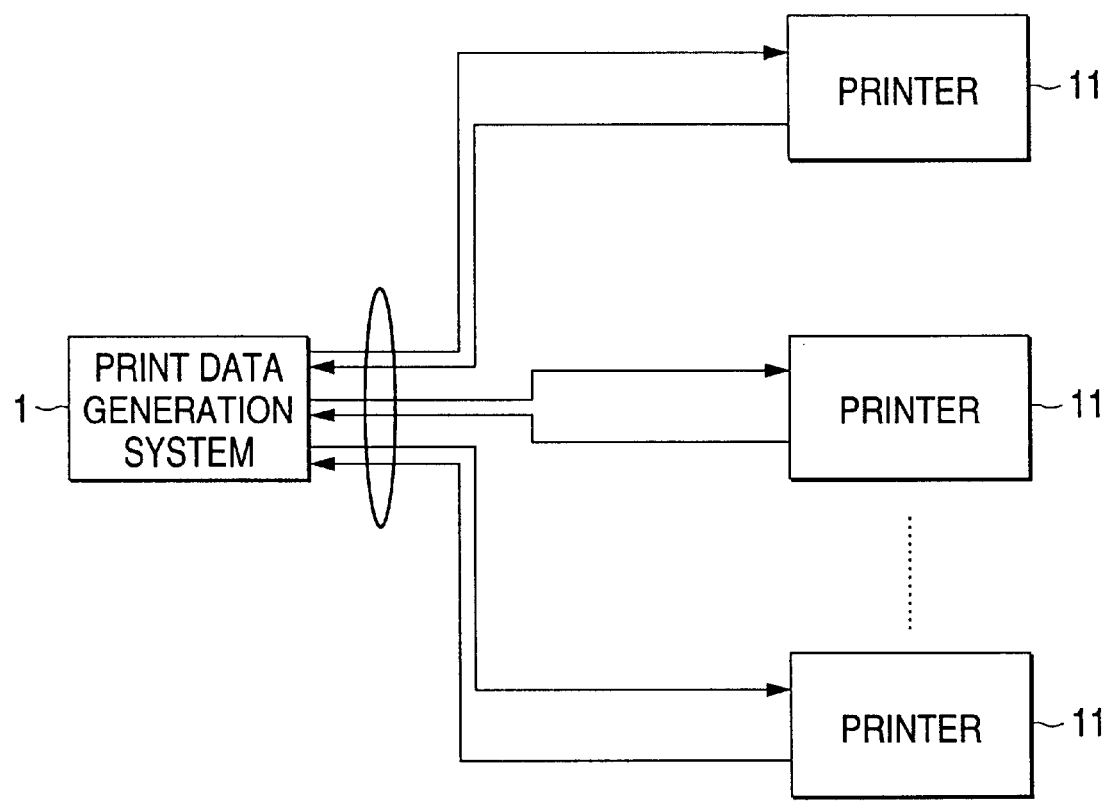
FIG. 2 is a functional block diagram illustrating another example of a system according to an embodiment of the present invention in which a plurality of printers and a print data generation system are connected by a network.

FIG. 1 is a functional block diagram illustrating a print data generation system 1 according to an embodiment of the present invention. FIG. 2 is a functional block diagram illustrating the print generation system 1 networked to a plurality of printers 11 by a LAN, for example. For simplicity, only one printer 11 is shown in FIG. 1.

The print data generation system 1 includes a print contents application program 1A which generates print data based on specified print contents to be printed at a printer 11, and a temporary print request transmitter 2 for transmitting a temporary print request to a printer 11. The print contents are, for example, the information contents to be printed, or a document file created through an application program, such as a document preparation software or CAD software program. The temporary print request is an undetermined print request issued to obtain acceptance information from a printer 11.

That is, the system 1 further comprises a print processing information request element 3 for requesting print processing information indicating the print processing state of a printer 11 based on acceptance information input from a printer 11 to the request element 3 in response to the temporary print request. The acceptance information is, for example, the print request acceptance number in the printer 11.

The system 1 further includes a selection element 4 for selecting a printer 11 for which the temporary print request is determined based on the print processing information input from the printer 11 to the selection element 4. The print processing information contains, for example, the print job progress state, the number of unprocessed print jobs in the printer 11, and so on.

The system 1 also includes a print request determinator 5 for determining the temporary print request issued to the printer 11 if the selection element 4 selects the printer, and a print data generator 6 for generating the print data based on the print contents if the selection element 4 selects the printer 11. Additionally, the print data generation system 1 includes a summary information display 7 for displaying summary information pertaining to the selected printer 11 if the selection element 4 selects a printer 11. The summary information includes information indicating the printer installation location, the printer state (e.g., performance, specifications, operating environment as described in more detail below), and so on.

If the user wants to print the print contents, the application program 1A creates the print contents and provides it to the temporary print request transmitter 2, which then transmits a temporary print request to a printer 11. Upon reception of the temporary print request, the printer 11 returns acceptance information to the print data generation system 1. The print processing information requester 3 sends acceptance information to the printer 11, thereby making a request for print processing information.

Upon receipt of the print processing information request, the printer 11 returns print processing information to the print data generation system 1. Then, the selection element 4 determines, based on the print processing information, whether the printer 11 to which the temporary print request was sent should be selected for printing.

For example, if the selection element 4 determines that the print wait time of the printer 11 is too long because the printer 11 is holding a large number of unprocessed print jobs, the temporary print request for the printer 11 can be canceled, and the state of another printer (not shown) in the network can be queried. On the other hand, if the selection element 4 determines that the printer 11 has been assigned only a small number of unprocessed print jobs and the print jobs will be processed promptly, the selection element 4 can select the printer 11. After the printer 11 is selected, the print data generator 6 generates print data.

Hence, by performing the above process before the print data is generated, the processing state of the printer and the load state on the printer are determined before the printer is selected and before the print data is generated. Accordingly, the print wait time can be shortened, and the print efficiency and business processing efficiency can be enhanced. The user can also monitor the state of the printers connected to the network without installing a dedicated print server.

As explained above, the temporary print request transmitter 2 transmits the temporary print request to a plurality of printers, and the selection element 4 selects one or more of the printers 11 based on the print processing information received from each of the printers 11. A temporary print request may be sent to all of the printers simultaneously, or may be transmitted to the printers 11 in a particular order. The selection element 4 compares the print processing information received from the printers 11 to select an appropriate printer 11.

Generally, a document file is printed at a specific printer 11. Therefore, usually the selection element 4 need only select any one of the printers 11. However, printing of a large document file or a large number of copies of a document file may be shared among printers 11. Also, to print a document file including text data and image data, it is possible to print the text data portion at a monochrome laser printer, and the image data part at a color ink jet printer. In this case, the selection element 4 selects multiple printers 11.

As described above, the print processing information contains at least the number of print pages of unprocessed print jobs registered in the corresponding printer 11. The selection element 4 can therefore predict the print wait time in each printer 11 at least based on the number of print pages of unprocessed print jobs registered in each printer 11, and can select one or more printers from among the printers based on the print wait time.

Since the number of print pages of unprocessed print jobs is contained in the print processing information received from each printer, the print wait time for each printer can easily be predicted based on the number of print pages. For example, if one printer holds a print job of 1000 pages and another printer has a print job of 10 pages, it can be estimated that the print wait time of the latter printer having a smaller number of print pages is much shorter than that of the former. The selection element 4 therefore predicts the print wait time based on the print processing information containing the number of print pages, and compares the predicted print wait times with each other to, for example, selecting a printer having the shortest wait time.

It is also noted that the print processing information could contains data indicating the predicted print wait time based on the number of print pages of unprocessed print jobs registered in the corresponding printer. In this case, the selection element can 4 selects one or more printers from among the printers based on the print wait time without having to calculate the print wait time base on the information pertaining to the number of pages remaining to be printed by each printer 11.

The print processing information can further include printer state information representing a state of the corresponding printer 11. The printer state information contains performance information concerning performance of paper size such as A4 or A2, printable colors of print engine, print resolution, the remaining paper amount, the remaining ink amount, and so on. The selection element 4 can therefore select one or more printers from among the printers having a particular state matching the print contents based on, for example, the print wait time of those printers.

A The print contents are determined to match the printer state if, for example, the printer has the appropriate specifications, performance capability, and so on to print the contents on the appropriate print recording medium. For example, if the print contents requires color printing on A2-size paper, this cannot be accomplished by a printer in which A2-size paper is not set or by a printer dedicated to monochrome print only. The number of printers in the network that are capable of handling a particular print job can thus be determined based on the printer state, which reduces the printer selection time.

It should be noted that the total print wait time WT discussed above can be predicted in accordance with the following equation (1):

$$WT = (PN/PS) + (CSN/JN)*TC \qquad (1)$$

where

JN is the total number of unprocessed print jobs registered in each printer;

PN is the total number of print pages of the unprocessed print jobs;

CSN is the number of context switch times;

PS is the printing speed of each printer; and

TC is the change time required for a context switch.

The number of print pages is a parameter related to the print wait time. The print time varies depending on the printing speed of the print engine. For example, if the number of print pages is 100, the time required for printing unprocessed pages at the printing speed of 10 sheets of paper per minute differs from that at the printing speed of 20 sheets of paper per minute. Therefore, the total number of print pages, PN, is divided by the printing speed PS to find the first index PN/PS.

The number of unprocessed print jobs is also a parameter related to the print wait time. The print time varies depending on the number of context switch times. For example, if the total number of unprocessed print jobs is 10, the entire print time when the number of context switch times is one differs from that when the number of context switch times is five. The context switch refers to changing the situation, environment, and so on, such as changing from one page description language to another, for example. The change time TC is required each time the execution environment is changed. Therefore, the time required for changing the environment is introduced as the second index CSN/JN*TC, whereby the print wait time can be predicted with comparatively high accuracy, so that an appropriate printer can be selected easily.

A third index may be added to equation (1). For example, considering data transfer time TD required for downloading print data from the print data generation system to the printer, TD*JN can also be added to the above-mentioned expression as a third index as follows in equation (2):

$$WT = (PN/PS) + (CSN/JN)*TC + TD/JN \qquad (2).$$

As discussed above, it is desirable for the selection element 4 to select a printer 11 whose print wait time is short. However, if such a printer 11 is at a location distant from the user, the user may not wish to select this printer 11.

Accordingly, when the summary information of the printer 11 chosen by the selection element 4 based on, for example, short wait time is displayed on the display 7, the user can determine whether the printer 11 to be selected is indeed desirable. Also, the summary information need not include only visual information, but can also include audible information produced by a sound producing device (not shown), a tactile display produced by a braille generator (not shown), and so on.

The details of the printers 11 will now be discussed. Each printer 11 includes a print engine 12 for printing based on input print data. Each printer 11 also includes a print job management table 13 for managing each registered unprocessed print job based on, for example, the number of print pages, and an acceptance information issuance element 14 for issuing acceptance information to a party making a temporary print request as described above.

Each printer 11 further includes a print processing information transmitter 15 for detecting the print processing information based on the print job management table 13 and transmitting the detected print processing information to, for example, the print data generation system 1. Also, a table manager 16 in each printer 11 updates the storage contents of the print job management table 13 if the temporary print request is determined based on the print processing information. The drive controller 17 of each printer 11 controls the print engine 12 based on input print data.

When a temporary print request is input from an external host computer (not shown) of the print data generation system 1, for example, the acceptance information issuance element 14 issues acceptance information. When the acceptance information is then provided by the host computer and print processing information is requested by the host computer, the print processing information transmitter 15 looks up the print processing information in the print job management table 13 and provides that print processing information to the host computer.

If it is determined that printing is to be executed at the printer 11 as a result of comparing the print processing information with that of another printer, the temporary print request is issued. The print processing information contents change with the new registered print job. Then, the table manager 16 updates the storage contents of the print job management table 13 to include the temporary print request.

When the processing time for the determined print request arrives, print data is transferred to the printer 11 in response to a data transfer request issued by the printer. The drive controller 17 drives the print engine 12 based on the input print data to print the print information on a print recording medium.

It is noted that when a temporary print request is input from the print data generation system 1, the response information comprising the print processing information and acceptance information is transmitted from the printer 11 to the print data generation system 1. Hence, the acceptance information and print processing information are exchanged by a single process, thus improving printing efficiency.

A more detailed example of a print data generation system according to an embodiment of the invention will now be described with regard to FIGS. 3–7.

Figure 3:
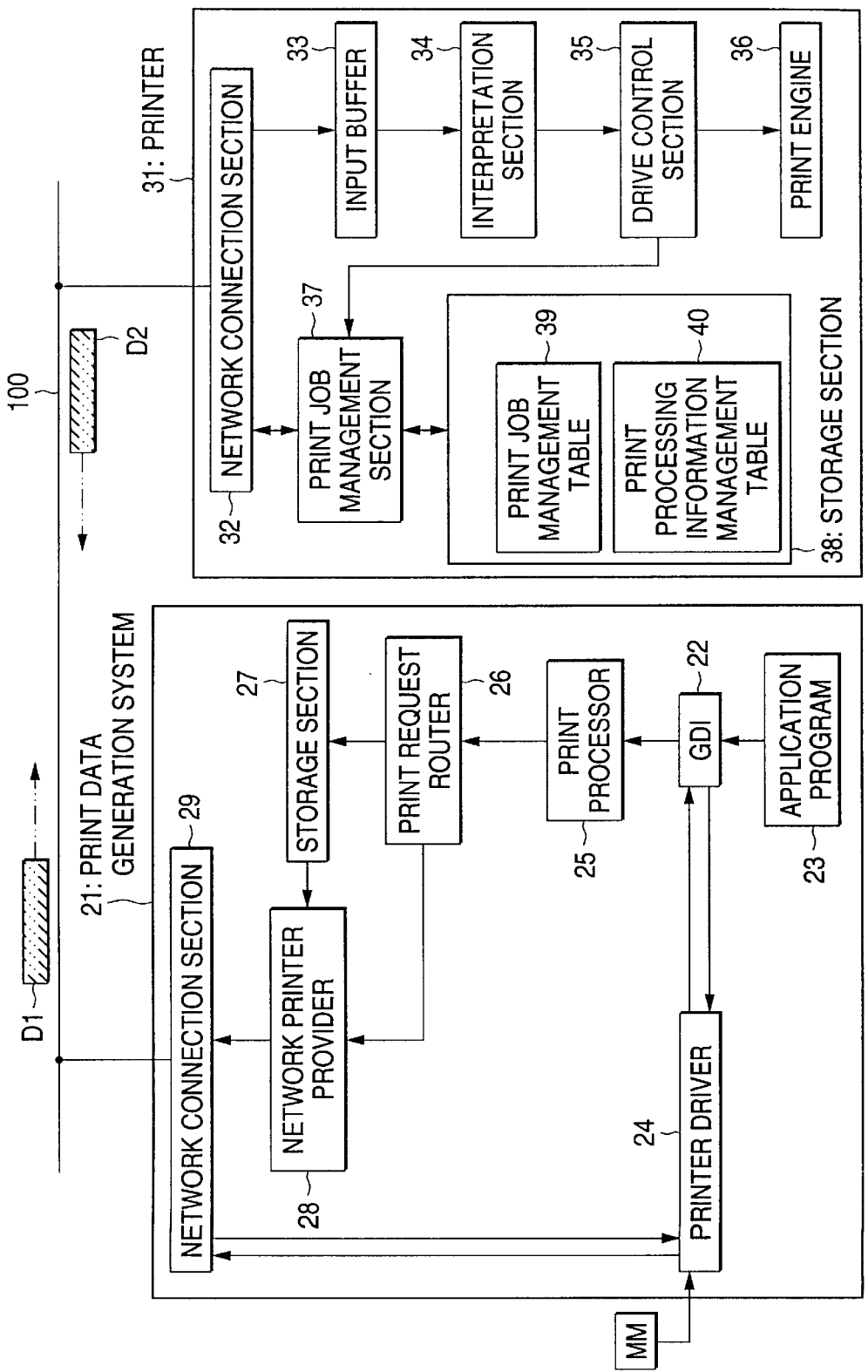
FIG. 3 is a block diagram of a printing system according to an embodiment of the present invention.

FIG. 3 is a block diagram of a printing system according to the present invention which includes a print data generation system 21. The print data generation system 21 comprises a graphics device interface (GDI) 22, an application program 23, a printer driver 24, a print processor 25, a print request router 26, a storage section 27, a network printer provider 28, and a network connection section 29 which are described in more detail below. The print data generation system 21 can be embodied, for example, in a personal computer, a workstation, and the like.

The graphics device interface (GDI) 22 is an application program interface (API) for executing data communication between an application program 23, such as a document preparation software program, and a printer 31 which is described in more detail below, and for managing graphics elements, in particular. The GDI 22 is operatively associated with a device independent bit map (DIB) engine (not shown) for generating image data.

The printer driver 24 generates print data to be output to the printer 31. The printer driver 24 is connected to the GDI 22 and converts image data into print data that can be interpreted by the printer 31 in response to a drawing instruction from the GDI 22. The print data generated by the printer driver 24 is input via the GDI 22 to the print processor 25, via which the print data is input to the print request router 26. That is, the print processor 25 functions as a buffer for transferring the print data.

The print request router 26 routes print data to its transfer destination. For example, the print request router 26 stores print data in a spool file in the storage section 27, or transfers the print data stored in the spool file to the network printer provider 28.

That is, the print request router 26 stores the generated print data in a spool file in the storage section 27, and when the time to print the print data arrives, transmits the print data in the storage section 27 to the selected printer 31. Specifically, the print request router 26 transfers the print data to the network printer provider 28 together with the network address of the printer 31, and any other pertinent data.

The network printer provider 28 functions as an interface for transferring the print data to the network connection section 29 and the print data input to the network printer provider 28 is transmitted through the network connection section 29 to the selected printer 31. The network connection section 29 is provided for two-way communication with the printer 31 over a communication line 100, for example, and comprises protocols including a TCP/IP (Transmission Control Protocol/Internet Protocol), and the like.

The temporary print request transmitter 2, print processing information request element 3, selection element 4, print request determinator 5, print data generator 6, and summary information display 7 as shown in FIG. 1 are essentially embodied by the printer driver 24. However, data is transferred using the function of the network connection section 29, and is displayed using the function of the GDI 22 as described above.

The printer 31 comprises a network connection section 32, an input buffer 33, an interpretation section 34, a drive control section 35, a print engine 36, a print job management section 37, and a storage section 38 which includes a print job management table 39 and a print processing information management table 40.

The network connection section 32 is provided for two-way communication with the print data generation system 21 over the communication line 100 in a manner similar to the network connection section 29 of the print data generation system 21. The input buffer 33 temporarily stores print data input from the print data generation system 21, and the interpretation section 34 interprets the print data and converts it into bit image data. The drive control section 35 controls driving of the print engine 36 based on the print data.

The print engine 36 forms dots, for example, on a print recording medium for printing. The print engine 36 can be a laser print engine, an ink jet print engine, a thermal transfer print engine, or any other type of print engine.

The print job management section 37 manages processing progress of print jobs registered (reserved) in the printer 31. In particular, the print job management section 37 responds to a temporary print request from the print data generation system 21 with acceptance information and transmits print processing information to the print data generation system 21 in response to a print request.

When a print request is determined, the print job management section 37 stores various pieces of information concerning the print request, such as the address of the print data generation system 21, the number of print pages, and so on, in a print job management table 39 provided in the storage section 38, and updates the contents of the storage section. Hence, the print job management section 37 essentially embodies the acceptance information issuance element 14, print processing information transmitter 15, and table manager 16 shown in FIG. 1 and described above.

The print job management table 39 and a print processing information management table 40 are provided in the storage section 38 which includes, for example, a flash ROM, a hard disk unit, or the like. As shown in FIG. 4, the print job management table 39 is provided for managing the address of the print data generation system 21, command system, the number of print pages, paper size, color information, and determination flag related to each print job acceptance number. The acceptance information is print job acceptance information, namely, acceptance number indicating the print request processing order. The address is an address to identify the print data generation system 21 connected to the network.

The command system is a print command type system, such as a PCL (Printer Control Language, which is a page description language developed by Hewlett-Packard), PS (PostScript, which a page description language developed by Adobe Systems), ESC/Page (which is an Epson Standard Code for Printer, page printer control code developed by Seiko Epson Corporation), or the like, and is represented as type1, type2, or type3 in FIG. 4

The number of print pages is the number of pages to be printed. The paper size is the size of a print recording medium. The color information is information indicating the print type, namely, color or monochrome print. The determination flag is a flag indicating whether or not the corresponding print request is determined.

When the determination flag is set to "1," an actual print request has been received and is registered as a print job. If the determination flag is set to "0," an actual print request has not been determined and thus, the request remains as a temporary print request.

The acceptance information is given a consecutive number following the determined print request. That is, as shown in FIG. 4, the acceptance information entries 01–05 are actual print requests. Therefore, when a temporary print request is input, it is given acceptance information entry 06. If two temporary print requests are input, they are both given acceptance information entry 06.

As further shown in FIG. 4, the print processing information management table 40 is provided for managing the total number of print pages of unprocessed print jobs PN, printing speed of the print engine 36 PS, the number of context switch times CSN, the change time required for context switch TC, the total number of unprocessed print jobs JN, and the printer state. As discussed above, the printer state indicates the command system type, paper size, and color information (indicating whether or not color print is enabled) in the printer 31.

The total number of pages PN, the number of context switch times CSN, and the number of print jobs JN, can be retrieved from the print job management table 39. The change time TC, the printing speed PS, and the printer state can be preset in the print processing information management table 40. Therefore, the print processing information management table 40 need not be provided, and the print processing information can also be detected using the print job management table 39.

Examples of data structures of a temporary print request, acceptance information, and so on, that is exchanged between the print data generation system 21 and the printer 31 will now be discussed with reference to FIGS. 5A and 5B.

FIG. 5A is a schematic representation illustrating the structure of data D1 transmitted from the print data generation system 21 to the printer 31. The data D1 has seven fields of request type, acceptance information, host address, command system, the number of print pages, paper size, and color information. The request type indicates that the data D1 is a temporary print request, an actual print request, or a cancel request.

For example, if the data D1 is a temporary print request, the request type is set to 0. If the data D1 is an actual print request to determine a temporary print request, the request type field is set to 1. If the data D1 is a cancel request for canceling a temporary or actual print request, the request type is set to 2. The values of 0, 1, 2, and so on, are values chosen for convenience of the description throughout the specification.

Acceptance information returned from the printer 31 in response to the temporary print request is stored in the acceptance information field. Therefore, data is not set in the acceptance information field before acceptance information is issued. The network address of the print data generation system 21 is set in the host address field. The command system of the print data to be printed, for example, the identifier of a page description language such as PCL described above, is set in the command system field.

The total number of pages to be printed is set in the number of print pages field, the print recording medium size is set in the paper size field, and the print type (color or monochrome print) is set in the color information field.

The structure of the data D1 transferred from the print data generation system 21 to the printer 31 is not limited to that shown in FIG. 5A. For example, to issue an actual print request, the data structure may contain at least the request type and the acceptance information, because when the temporary print request was issued, the information of the command system, the number of print pages, and so on, has been already transmitted and thus can be omitted.

If the printer 31 receives the temporary print request shown in FIG. 5A, the print job management section 37 stores the host address field, the command system field, the number of print pages field, the paper size field, etc., in the print job management table 39. In this case, the determination flag is set to 0 because the print request is a temporary print request.

FIG. 5B is a schematic representation of the structure of data D2 for transmitting acceptance information, etc., from the printer 31 to the print data generation system 21. The data D2 uses the above-described data D1 structure. That is, the data D2 includes seven fields including a request type field, acceptance information field, printer address field, command system field, remaining paper amount field, paper size field, and color information field.

Information indicating that the data is a response to the print data generation system 21 is set in the request type field. The acceptance information issued by the printer 31 is set in the acceptance information field. The network address indicating the location of the printer 31 is set in the printer address field.

Information indicating whether or not the command system specified by the print data generation system 21 can be executed, namely, whether or not the printer 31 installs the necessary page description language is set in the command system field. That is, if the required command system is installed and printing is possible, "1" is set in the command system field. However, if the required command system is not installed and printing is impossible, "0" is set in the command system field.

The data D2 includes a remaining paper amount field instead of a number of print pages field as in the data D1. The current remaining paper amount or predicted remaining paper amount (which equals the current remaining paper amount−total number of print pages of unprocessed print jobs+predicted paper feed amount) can be set in the remaining paper amount field.

Information indicating whether or not paper of the size specified by the print data generation system 21 is provided is set in the paper size field. That is, if paper of the size specified is provided in a paper feed tray, etc., "1" is set in the paper size field. However, if paper of the size specified is not provided, "0" is set in the paper size field.

Information indicating whether or not printing in print colors specified by the print data generation system 21 can be executed is set in the color information field. That is, when color printing is requested, information indicating whether or not it can be executed is set. If printing in the print colors specified can be executed, "1" is set in the color information field. However, if printing in the print colors specified cannot be executed, "0" is set in the color information field.

When the structures of the data D1 and data D2 are made common as indicated above, easy data operation can be executed. However, the data D1 and data D2 may differ in structure. For example, the remaining toner amount, the remaining ink amount, etc., can also be included as data fields in, for example, data D2.

Data transmitted from the printer 31 to the print data generation system 21 includes print processing information. To transmit the print processing information, print processing information containing the total number of unprocessed print jobs, the total number of print pages, the printing speed, the number of context switch times, and the change time is generated as shown in the print processing information management table 40 in FIG. 4, and is transmitted to the print data generation system 21. The command system, the paper size, the remaining paper amount, and the color information shown in FIG. 5B can be contained in the print processing information.

That is, the printer state of the printer 31 (command system, paper size, etc.,) may be transmitted at the stage where acceptance information is returned or where print processing information such as that shown in FIG. 5B is transmitted.

The operation of the system described above will now be discussed with reference to FIGS. 6 and 7.

Figure 6:
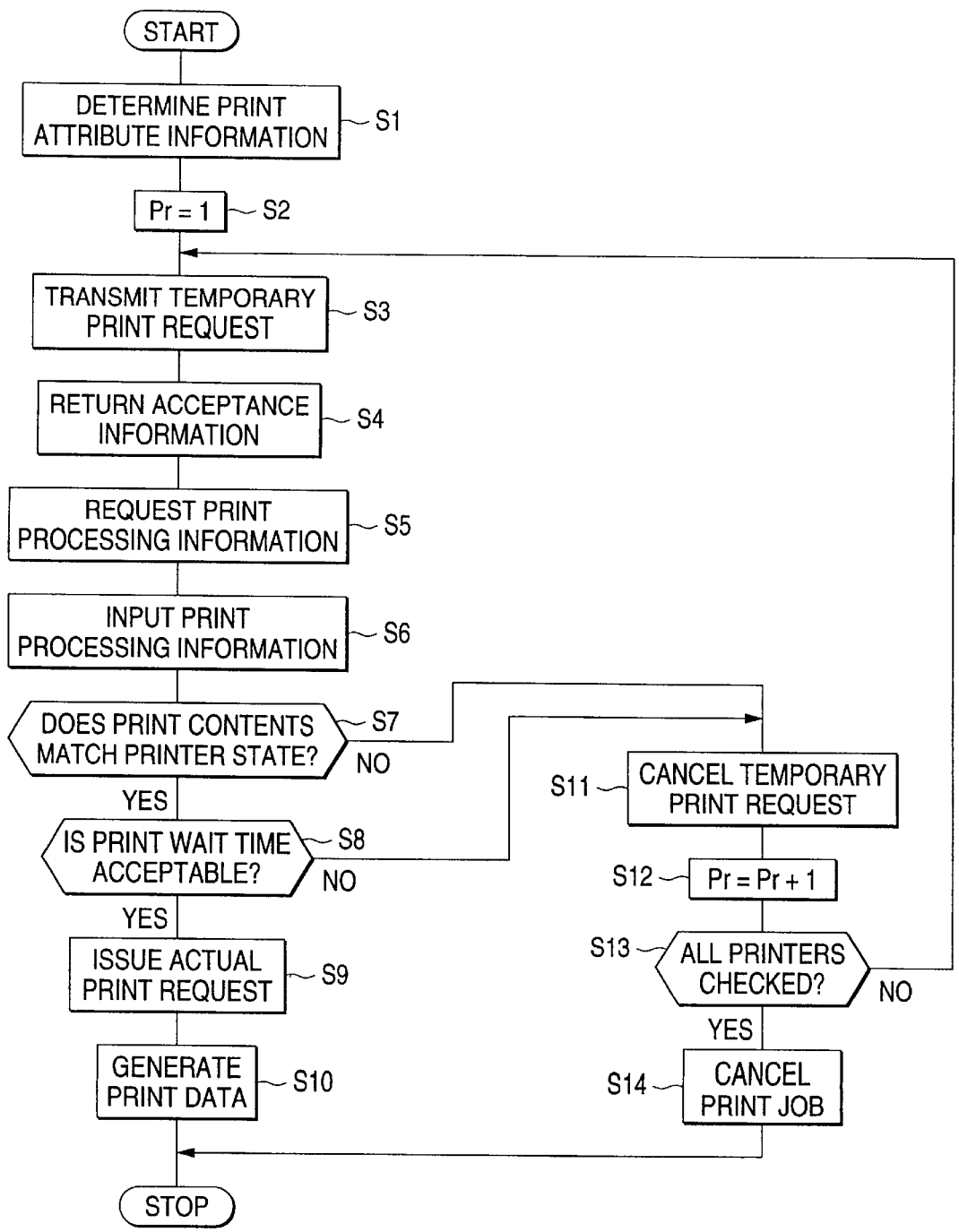
FIG. 6 is a flowchart illustrating processing of the print data generation system shown in FIG. 3.

FIG. 6 is a flowchart illustrating print data generation processing executed by the print data generation system 21. When the user gives a print command through the application program 23, for example, the command system, the number of print pages, the paper size, and the color information are determined based on the specified print contents in step S1. The command system, the number of print pages, the paper size, and the color information determined at step S1 can be described as the "print attribute information."

Next, to inquire as to the state of a plurality of printers 31 connected to the network in order, an initial value "1" is set as the printer specification number "Pr" in step S2. Therefore, the state of the printer 31 corresponding to the initial value is first checked.

In step S3, a temporary print request is transmitted to the printer 31 corresponding to the initial value set in step S2. Acceptance information is returned from the printer 31 in response to the temporary print request in step S4. Then, in step S5, a request for obtaining print processing information is sent to the printer 31 to inquire the load state on the printer 31, etc.

In step S6, print processing information is input from the printer 31 in response to the request for getting print processing information. In step S7, it is determined whether or not the print contents match the printer state of the printer 31 based on the print processing information. Specifically, in step S7, it is determined whether or not the command system, paper size, and color information required by the print contents match those with which the printer 31 is provided. If the printer 31 is not provided with the necessary command system or paper, the print contents specified from the application program 23 cannot be printed. Then, processing continues to step S11 as described later.

However, if the specified print contents match the printer state of the printer 31, processing proceeds to step S8 at which it is determined whether the print wait time predicted based on the print processing information is equal to or less than a predetermined value is determined.

For example, the print wait time WT can be predicted in accordance with equation (1) above, in which $$WT=(PN/PS)+(CSN/JN)*TC \qquad (1)$$

based on the total number of unprocessed print jobs JN registered in the printer 31, the total number of print pages PN of the unprocessed print jobs, the number of context switch times CSN, the printing speed PS of the printer 31, and the change time TC required for context switch. As explained above, the first index (PN/PS) is the total number of print pages, PN, divided by the printing speed PS. The processing termination time varies depending on the printing speed if the total number of print pages is the same. Therefore, the time required for printing unprocessed print pages can be found according to the first index.

As also explained above, the second index (CSN/JN)*TC indicates the time involved in execution environment change. For example, to change the command system for printing, it may become necessary to once clear the memory and load a new command system. Therefore, the time required for execution of an environment change is added as the second index.

The print wait time can be efficiently predicted based on the first and second indexes. Also, the print wait time prediction formula is not limited to equation (1). Rather, as described above, when the data transfer time TD required for downloading print data from the print data generation system 21 to the printer 31 is considered, TD*JN can also be added to equation 1 as a third index to form equation (2)

$$WT=(PN/PS)+(CSN/JN)*TC+TD/JN \qquad (2).$$

In step S8, the print wait time WT is predicted based on the print processing information from the printer 31, and it is determined whether the predicted print wait time WT is equal to or less than a predetermined value WTC. If the predicted print wait time WT is equal to or less than the predetermined value WTC, printing is executed relatively promptly. Hence, the printer 31 is selected, and an actual print request is issued at step S9, whereby the print request given to the printer 31 is determined.

The printer driver 24 generates print data based on the print contents specified from the application program 23 in step S10. The print data generated at step S10 is transferred to the printer 31 in response to a data transfer request (not shown) from the printer 31.

As mentioned above, if it is determined in step S7 that the print contents do not match the printer state of the printer 31, desired printing cannot be executed even if the printer 31 is selected. Also, if it is determined at step S8 that the print wait time WT is greater than the predetermined value WTC, the wait time is prolonged if the printer 31 is selected.

Accordingly, if NO is returned from either step S7 or S8, the temporary print request given to the printer 31 is canceled at step S11. In step S12, the state of another printer 31 is checked by incrementing the printer specification number Pr by one to specify the next printer 31.

It should be noted that the temporary print request can be canceled in response to an explicit cancel request from the print data generation system 21 as described above. In addition, the printer 31 can also be designed for canceling the temporary print request not determined after the expiration of a predetermined time.

In step S13, it is determined whether the state of all printers 31 has been checked. If a printer 31 whose state is not yet checked remains, processing returns to step S3, and steps S3–S13 are repeated.

However, if a printer 31 fitted to the print contents is not found after checking the state of all printers 31 connected to the network, NO is returned from step S13, and the print job is canceled in step S14. Also, a message to this effect can be provided to the user requesting the user's approval prior to canceling the print job.

Figure 7:
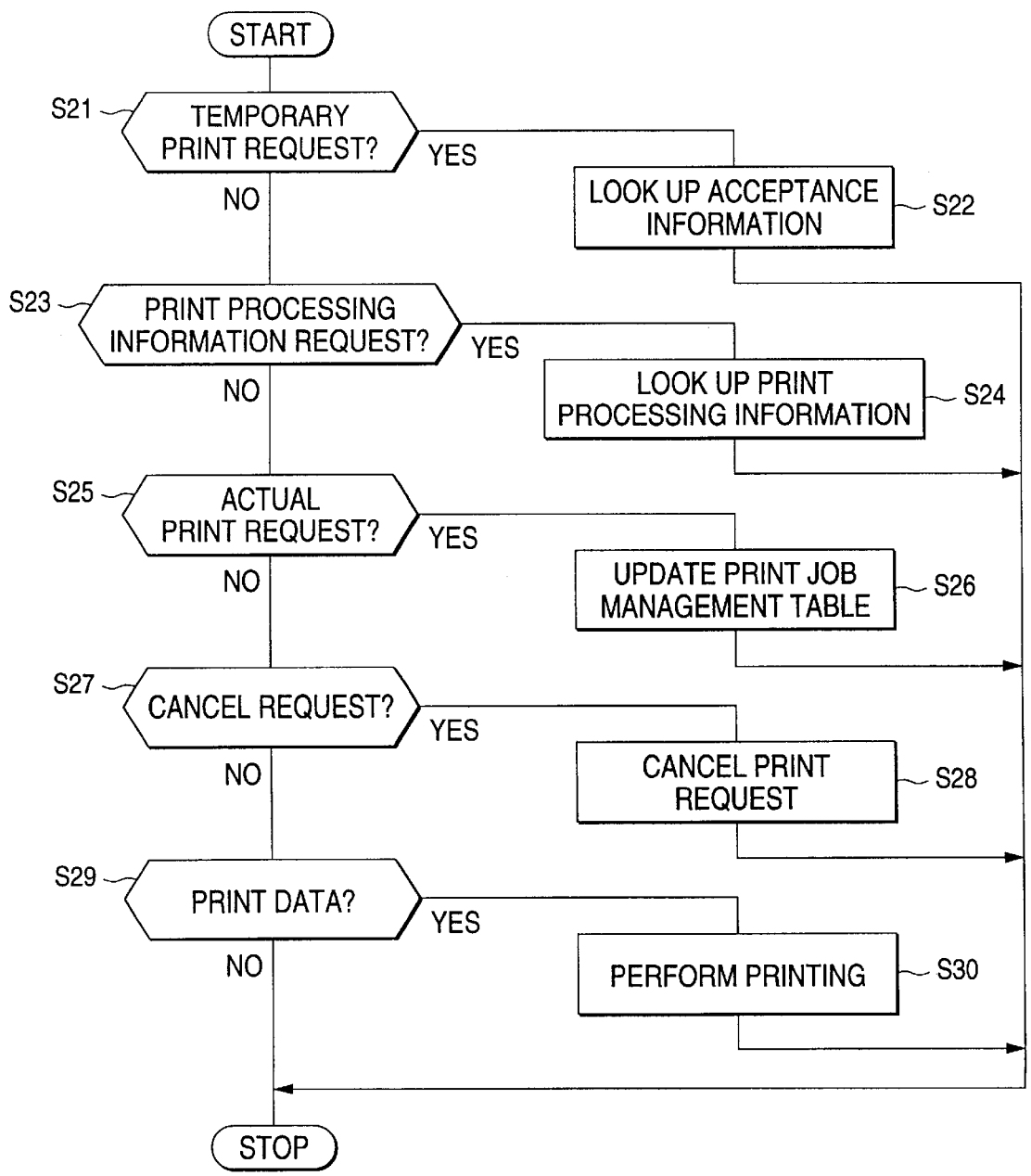
FIG. 7 is a flowchart illustrating processing of the printer according to the present invention.

FIG. 7 is a flowchart illustrating the processing executed by the printer 31.

In step S21, it is determined whether or not data input to the printer 31 is a temporary print request. If it is determined that the data is a temporary print request, acceptance information is looked up in the print job management table 39 in step S22, and the found acceptance information is returned to the print data generation system 21.

If it is not determined that the data is a temporary print request, it is determined in step S23 whether the request is a request for getting print processing information. If the print data generation system 21 issues a request for getting print processing information, print processing information is looked up in the print processing information management table 40 in step S24, and the found print processing information is returned to the print data generation system 21.

If it is not determined that the data is a request for getting print processing information, it is determined in step S25 whether the data is an actual print request. If the data is an actual print request, the temporary print request is identified as such, and the storage contents of the print job management table 39 and the print processing information management table 40 are updated in step S26.

If it is not determined that the data is an actual print request, it is determined in step S27 whether the data is a cancel requests If the data is a cancel request, the temporary print request or actual print request is canceled, and the storage contents of the management tables 39 and 40 are updated in step S28.

If it is not determined that the data is a cancel request, it is determined whether the input data is print data in step S29. If the input data is print data, the print data is interpreted by the interpretation section 34, and the print engine 36 is driven through the drive control section 35, thereby performing print processing in step S30.

Although the flowchart shown in FIG. 7 indicates that the type of data input to the printer 31 is determined and processing is performed in response to the determined data type, the data type determination order is not limited to that shown in FIG. 7.

According to the embodiment described above, the following advantages are provided.

A preferred printer is selected based on the print processing information, and then print data is generated. Thus, no time is wasted due to the cancellation of a print job after print data is generated as in the known systems. Hence, the print wait time is shortened, and the print efficiency and business processing efficiency can be improved.

Also each printer 31 can be requested to send print processing information, and an appropriate printer 31 can be selected based on the sent print processing information. Therefore, a dedicated print server need not be installed, and the load state and processing state of each printer 31 connected to the network can be checked easily and reliably under the peer-to-peer system.

In addition, it is determined whether the printer state of the printer 31 matches the print contents specified by the application program 23 and if they match, the print wait time is predicted and an appropriate printer 31 is selected. Hence, the printers for which the print wait time is predicted can be narrowed down, and the time required for printer selection can thus be shortened.

Furthermore, the printer 31 is made to issue acceptance information in response to a temporary print request. Hence, a print job related to printer selection can be easily identified by indicating the acceptance information. Therefore, the amount of data exchanged between the print data generation system 21 and the printer 31 can be lessened, and the network traffic can be decreased. The processing progress state of the selected printer 31 can also be inquired regularly or irregularly by indicating the acceptance information, so that the acceptance information can be indicated for inquiring the current print state, for example, if printing is not executed although the print wait time predicted at the beginning has elapsed.

In addition, the print wait time is predicted based on equations (1) or (2), and thus can be found easily with comparatively high accuracy.

Another processing method performed by the system described above will now be discussed with reference to FIGS. 8 and 9. In this second processing, the states of all the printers connected to a network are checked in unison, and a summary of a selected printer is displayed for obtaining user's approval.

Figure 8:
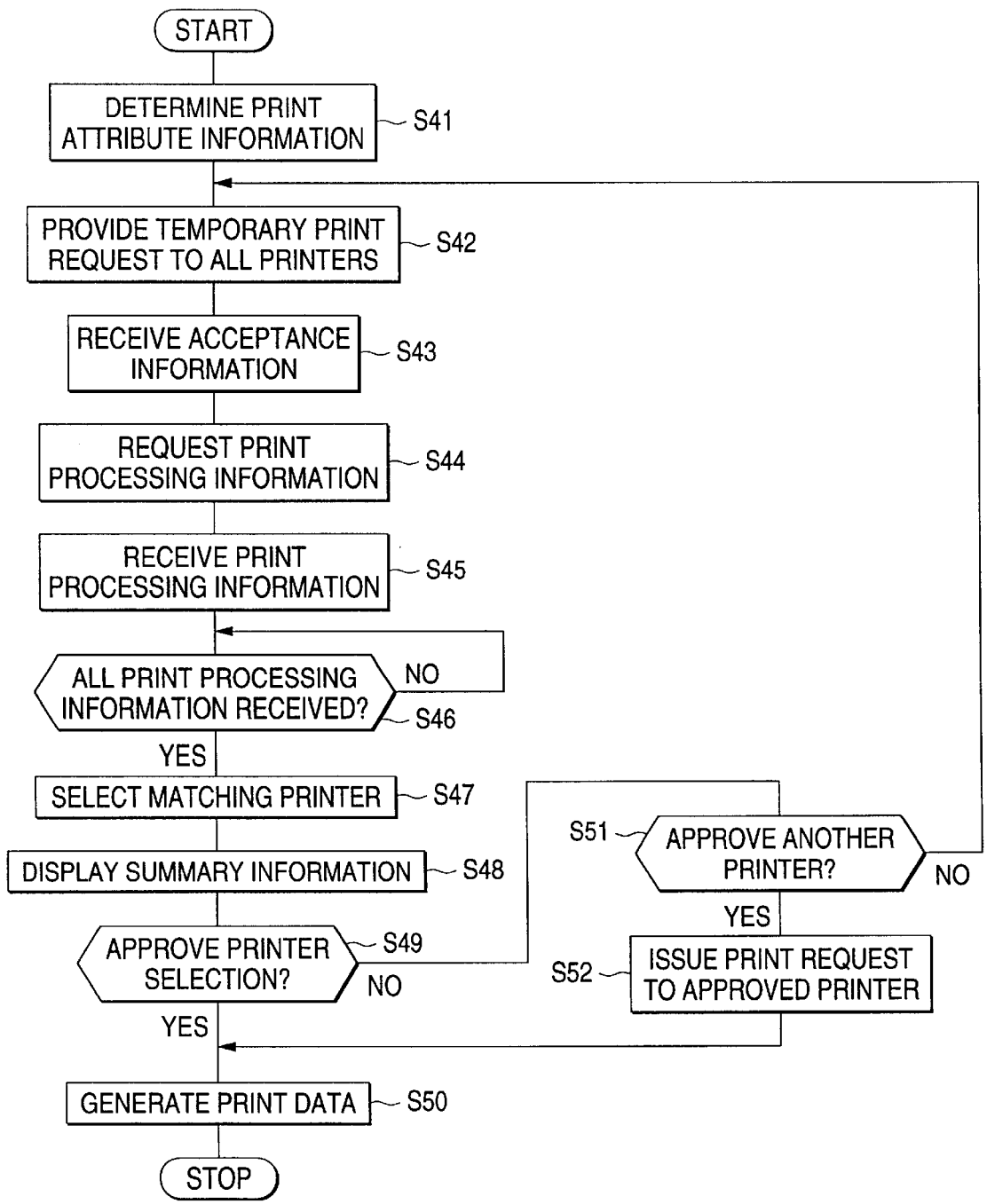
FIG. 8 is a flowchart illustrating another processing performed by a print data generation system according to the invention.

In particular, FIG. 8 is a flowchart illustrating print data generation processing according to the embodiment. First, print attribute information of the number of print pages, the command system, the color information, etc., is determined based on the print contents specified by an application program 22 in step S41. Then, in step S42, a temporary print request is provided to all printers 31 connected to the network.

When each printer 31 responds to the temporary print request with acceptance information in step S43, a request for print processing information is provided to the printers in step S44. Each printer 31 responds to the information request with print processing information in step S45.

In step S46, input of the print processing information from all printers 31 connected to the network is monitored until the print processing information is returned from each printer 31. Step S43 also may be followed by a reception wait determination step similar to step S46.

In step S47, a printer 31 matching the print contents is selected based on the print processing information from each printer 31. That is, it is determined whether the print contents match the printer state of the printer 31 is determined, and the print wait time is predicted for each fitted printer 31 as described above. Next, the printer 31 with the shortest print wait time WT predicted is selected from among the printers 31, whereby the temporary print request for the selected printer 31 is determined.

That is, in step S47, one of the printers is selected, and an actual print request is transmitted to the selected printer 31. Since user's approval is not obtained at step S47, the temporary print request for other printers 31 is not yet canceled.

Summary information of the printer 31 selected at step S47 is displayed on a display, for example, in step S48. The summary information is information indicating a summary of the installation location, print performance, etc., of the printer 31. If a large number of printers are connected to the network, there is a possibility that the user may not keep track of the installation location of the selected printer 31, or the user may determine that a parameter other than the print wait time, such as the distance to the installation location, is important.

Figure 9:
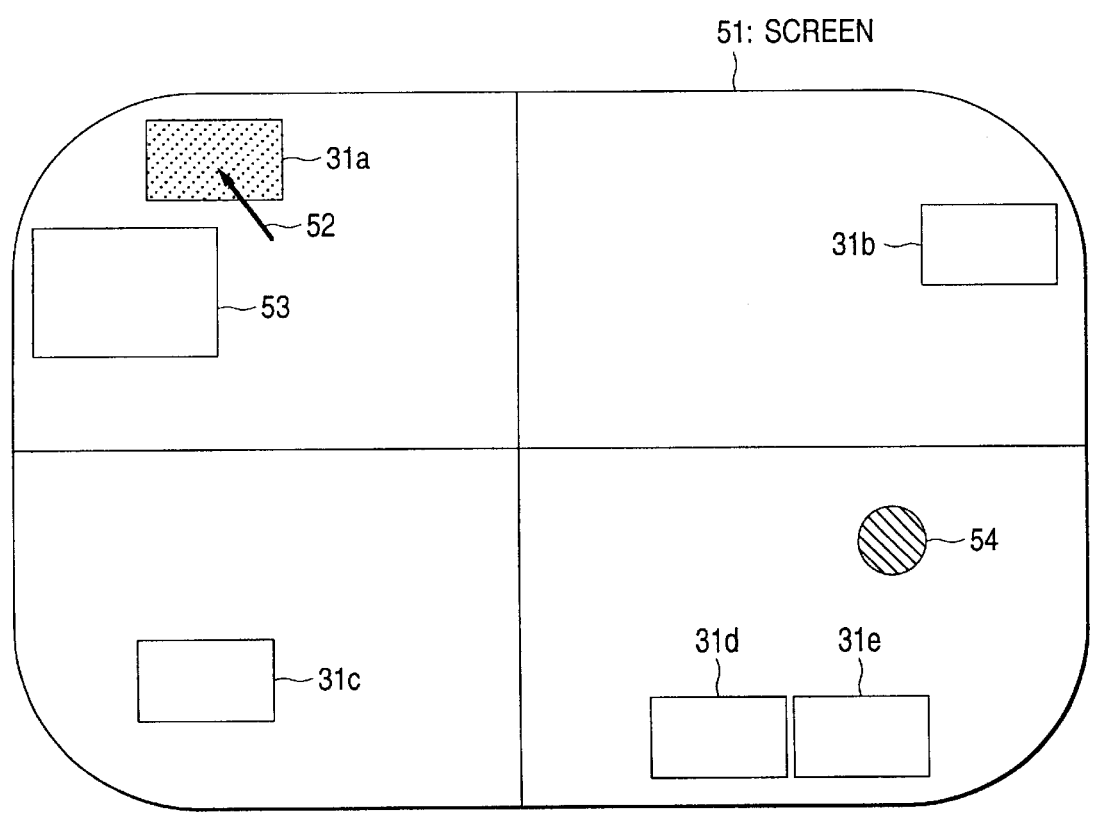
FIG. 9 is a schematic representation of an example of the display of summary information of a selected printer according to the present invention.

FIG. 9 is a schematic representation illustrating an example displayed summary information of the selected printer 31. The installation locations of five printers 31a–31e are shown on a screen 51 of a display (e.g., display 7 shown in FIG. 3). The hatched printer 31a is a selected printer.

For example, the symbol mark of the selected printer 31a is reverse-displayed or highlighted for distinguishing the selected printer 31a from other printers 31b–31e. If a pointer 52 is positioned above or near the selected printer 31a, summary information 53 other than the installation location belonging to the printer 31a is displayed.

The installation position of a print data generation system 21 is displayed on the screen 51 as a user position 54. Therefore, the user can easily keep track of the installation location, the distance to the selected printer 31a, and so on.

Although FIG. 9 further shows that summary information such as the installation state of the printers 31a–31e is displayed on the entire screen 51 of the display, the information may be displayed on a part of the screen 51, or in any other manner. The user can also use the pointer to point out any other printer 31b–31e for displaying the summary information thereof.

The user determines in step S49 whether to approve the selected printer (e.g., printer 31a). If the user decides in step S49 that the printer 31a selected in step S47 is appropriate, the user enters an approval signal through a pointing device, a keyboard, or the like. Since the printer selection at step S47 is approved, the temporary print request for other printers 31 can be canceled. Then, the printer 31 is selected, print data is generated in step S50.

However, if the user is not satisfied with the selected printer 31a (e.g., because the installation location of the printer is too far away, or for any other reason), the user can cancel selection of the printer 31a. Then, a NO is returned from step S49, and processing proceeds to step S51.

If the user does not give approval to selection of the printer 31a, it is determined in step S51 whether the user has specified any other printer 31. For example, the user can specify the printer 31e (see FIG. 9) near the user's position 54 instead of the printer 31a. If a printer 31e is specified by the user, an actual print request is issued to the printer 31e, and the temporary print request for other printers 31 is canceled in step S52. The print data is then generated in step S50.

The processing described above provides advantages similar to those described above for the processing shown in FIGS. 6 and 7. In addition, the following advantages are provided.

A temporary print request is provided to all the printers 31, and a request for print processing information is sent to the printers 31 in unison. Hence, the user can promptly keep track of the state of the printers 31 connected to the network.

Also, the summary information of a selected printer 31 is displayed, so that the user can easily check whether or not the printer selection is appropriate.

It is understood by those skilled in the art that the foregoing description is preferred embodiments and that various changes and modifications may be made in the invention without departing from the spirit and scope thereof.

For example, the print data generation system can be provided with a specification management table for recording the specifications of the printers connected to the network, and only the printers having the specifications matching the print contents can be chosen for transmission of a temporary print request thereto.

It is also possible to find an appropriate printer by comparing the total values of evaluation points of printers as a penalty control criteria, rather than by comparing predicted print wait times. For example, previously weighted evaluation points are given separately to the parameters of the number of unprocessed print jobs, the number of print pages, the number of context switch times, etc., and a printer with the total evaluation points of the parameters reaching the minimum can be selected.

For instance, two evaluation points are given per unprocessed print job, one evaluation point is given per page to be printed, and three evaluation points are given per context switch time. Therefore, the total evaluation points of a printer having 10 jobs, 100 pages, and five switch times become $10*2+100*1+5*3=135$. On the other hand, the total evaluation points of a printer having five jobs, 100 pages, and two switch times become $5*2+100*1+2*3=116$. Therefore, in this case, the printer getting 116 points is selected.

The selection method based on the evaluation points need not unify the dimensions of the units. Therefore, for example, parameters of the distance between user and printer positions, the remaining paper amount, the remaining toner amount, etc., different in dimension can be introduced into the decision.

Furthermore, as shown in FIG. 3, a program or the like for embodying the invention can be recorded on a recording medium MM, and the recorded contents of the recording medium MM can be loaded into the print data generation system 21. In addition to a physical recording media, such as floppy disk, CD-ROM, DVD-ROM, and memory card, a communication medium using a communication line for downloading can function as the recording medium MM. Likewise a recording medium on which a predetermined program is recorded can be used to load the program to the printers.

In the embodiments described above, the issuance of the acceptance information and transmission of the print processing information are executed separately. However, when the acceptance information is issued, the print processing information can also be transmitted together with the acceptance information. In other words, the print processing information can contain also the acceptance information.

Furthermore, as described above, the print data generation system predicts the print wait time. Alternatively, each printer can also predict the print wait time, and transmit print processing information containing the predicted print wait time to the print data generation system.

While the invention has been particularly shown and described with reference to preferred embodiments thereof, it will be understood by those skilled in the art that various changes in form and details may be made therein without departing from the spirit and scope of the invention.

What is claimed is:

1. A print data generation system used for a local area network for generating print data, based on specific print contents, for printing by at least one of a plurality of printers in a printer network, said system comprising:

a temporary print request transmitter located at a work station which broadcasts a temporary print request to said plurality of printers through the local area network;

a print processing information request element located at a work station which requests print processing information indicating a print processing state of each of said plurality of printers based on acceptance information provided from said plurality of printers indicating receipt of the temporary print request by each of said plurality of printers through the local area network;

a selector located at a work station which selects at least one of said plurality of printers through the local area network based on the print processing information;

a spooler located at a work station in which the print data is spooled; and a print data generator located at a work station which generates the print data into said spooler for printing by the printer selected by said selector through the local area network, wherein print data generation does not precede printer selection.

2. The print data generation system as claimed in claim 1, wherein:

the print processing information contains at least the number of print pages of unprocessed print jobs registered in the corresponding printer; and said selector predicts print wait time in each of said printers to which the temporary print request was sent based on the number of print pages of unprocessed print jobs registered in each said printer, and selects at least one of said printers for printing based on the print wait time.

3. The print data generation system as claimed in claim 1, wherein:

the print processing information contains at least the print wait time predicted based on the number of print pages of unprocessed print jobs registered in a corresponding printer; and said selection means selects at least one of said printers for printing based on the print wait time.

4. The print data generation system as claimed in claim 2, wherein:

the print processing information further includes a printer state representing a characteristic of a corresponding printer; and said selector selects one or more printers, from among the printers whose printer state matches the print contents, based on the print wait time.

5. The print data generation system as claimed in claim 4, further comprising:

a summary information display which displays summary information describing characteristics of the selected printer.

6. A print data generation system used for a local area network for generating print data, based on specific print contents, for printing by at least one of a plurality of printers in a printer network, said system comprising:

a temporary print request transmitter located at a work station which transmits a temporary print request to said plurality of printers through the local area network;

a print processing information request element located at a work station which requests print processing information indicating a print processing state of each of said plurality of printers based on acceptance information provided from said plurality of printers indicating receipt of the temporary print request by each of said plurality of printers through the local area network;

a selector located at a work station which selects at least one of said plurality of printers through the local area network based on the print processing information; and a print data generator located at a work station which generates the print data for printing by the printer selected by said selector through the local area network, the print processing information contains at least the number of print pages of unprocessed print jobs registered in the corresponding printer; and said selector predicts print wait time in each of said printers to which the temporary print request was sent based on the number of print pages of unprocessed print jobs registered in each said printer, and selects at least one of said printers for printing based on the print wait time wherein:

print wait time WT is predicted as $$WT=(PN/PS)+(CSN/JN)*TC$$

where JN is the total number of unprocessed print jobs registered in each printer, PN is the total number of print pages of the unprocessed print jobs, CSN is the number of context switch times, PS is printing speed of each printer, and TC is the change time required for context switch.

7. A printer for controlling operation of a print engine based on input print data to control printing, said printer comprising:

a print job management table which manages each registered unprocessed print job based on a number of print pages of each said print job;

an acceptance information issuance device which issues acceptance information to an entity from which is provided a temporary print request;

a print processing information transmitter means which transmits print processing information, including at least the total number of unprocessed print pages to be printed, to said entity in response to a request for said print processing information from said entity based on said acceptance information;

a table manager which updates the contents of said print job management table when printing is to occur; and a drive control which controls the print engine based on input print data to control printing from said entity.

8. A printing system comprising:

a print data generation system for generating print data based on specified print contents; and a plurality of printers, each of which controlling operation of a respective print engine based on print data input from said print data generation system, to print the print contents on a respective print recording medium;

said print data generation system comprising:

a temporary print request transmitter which transmits a temporary print request to said printers;

a print processing information requester which requests print processing information indicating a print processing state, including at least the total number of unprocessed print pages to be printed, from each printer based on acceptance information input from each printer in response to the temporary print request;

a selector which selects at least one of said printers based on the print processing information input from said printers;

a print request determinator which determines and generates an actual print request which is transmitted to the at least one of said selected printers;

a print data generator which generates the print data based on the print contents if said selector selects the printer; and each of said plurality of printers comprises:

a print job management table for managing each registered unprocessed print job by relating at least the number of print pages;

an acceptable information issuer which issues the acceptance information to said print data generation system in response to the temporary print request;

a print processing information transmitter which detects the print processing information based on said print job management table and transmits the detected print processing information, including at least the total number of unprocessed print pages to be printed, to said print data generation system if a request for the print processing information is made;

a table manager which updates storage contents of said print job management table if the printer is selected for printing; and a drive control which controls the print engine based on the print data input from said print data generation system.

9. A printing system comprising:

a print data generation system which generates print data based on specified print contents; and a plurality of printers, each of which controlling drive of a respective print engine based on print data input from said print data generation system, to print the print contents on a respective print recording medium;

said print data generation system comprising:

a temporary print request transmitter which transmits a temporary print request to said printers;

a selector which selects at least one of said printers from among said printers based on response information, including at least the total number of unprocessed print pages to be printed, input from each printer in response to the temporary print request;

a print request determinator which determines and generates an actual print request which is transmitted to the at least one of said selected printers; and a print data generator which generates the print data based on the print contents if said selection means selects the printer; and each of said plurality of printers comprises:

a print job management table which manages each registered unprocessed print job based on the number of print pages of each said print job;

a response information transmitter which detects the print processing information based on said print job management table and transmits response information comprising the print processing information, including at least the total number of unprocessed print pages to be printed, and acceptance information to said print data generation system if the temporary print request is transmitted from said temporary print request transmitter;

a table manager which updates storage contents of said print job management table if the temporary print request is determined based on the response information; and a drive control which controls the print engine based on the print data input from said print data generation system.

10. A computer-readable medium of instructions for controlling a computer to control a printing system comprising a plurality of printer, said computer-readable recording medium comprising:

a data structure which controls computer to transmit a temporary print request to said plurality of printers;

a data structure which controls the computer to receive acceptance information from each of the printers;

a data structure which controls the computer to request print processing information indicating a print processing state for each printer based on the acceptance information;

a data structure which controls the computer to receive the print processing information including at least the total number of unprocessed print pages to be printed, from each printer;

a data structure which controls the computer to select at least one of the printers based on the print processing information; and a data structure which controls the computer to generate the print data based on the print contents.

11. A print data generation system for generating print data, based on specific print contents, for printing by at least one of a plurality of printers in a printer network, said system comprising:

a temporary print request transmitter which transmits a temporary print request to a particular printer;

a print processing information request element which requests print processing information indicating a print processing state of the printer, including at least the total number of print pages of unprocessed print jobs to be printed which are registered in the printer, based on acceptance information provided from the printer indicating receipt of the temporary print request by the printer;

a selector which selects the printer based on the print processing information; and a print data generator which generates the print data for printing by the printer selected by said selector.

12. A print data generation system as claimed in claim 11, wherein:

said temporary print request transmitter transmits the temporary print request to a plurality of said printers; and said selector selects at least one of said printers based on the print processing information input from each of the printers.

13. A print data generation system as claimed in claim 12, wherein:

the print processing information contains at least the number of print pages of unprocessed print jobs registered in a corresponding printer; and said selector predicts print wait time in each of said printers to which the temporary print request was sent based on the number of print pages of unprocessed print jobs registered in each said printer, and selects at least one of said printers for printing based on the print wait time.

14. A print data generation system as claimed in claim 12, wherein:

the print processing information contains at least the print wait time predicted based on the number of print pages of unprocessed print jobs registered in a corresponding printer; and said selection means selects at least one of said printers for printing based on the print wait time.

15. A print data generation system as claimed in claim 13, wherein:

the print processing information further includes a printer state representing a characteristic of a corresponding printer; and said selector selects one or more printers, from among the printers whose printer state matches the print contents, based on the print wait time.

16. A print data generation system as claimed in 15, further comprising:

a summary information display which displays summary information describing characteristics of the selected printer.

17. A method for controlling a network of printers to print specified print contents, said method comprising the steps of:
   transmitting a temporary print request to a plurality of printers;
   receiving acceptance information from each of the printers;
   requesting print processing information, indicating a print processing state of each printer, based on the acceptance information;
   receiving the print processing information, including at least the total number of unprocessed print pages to be printed, from each printer;
   selecting at least one of said printers from printing based on the print processing information input; and
   generating, based on the print contents, print data for printing by said selected printer.

18. A method as claimed in claim 17, wherein:
   the print processing information contains at least the number of print pages of unprocessed print jobs registered in a corresponding printer; and
   said printer selecting step includes the steps of:
      predicting print wait time in each of said printers to which the temporary print request has been sent, based on the number of print pages of unprocessed print jobs registered in each printer; and
      selecting said at least one printer for printing based on the print wait time.

19. A method as claimed in claim 17, wherein:
   the print processing information contains at least the print wait time predicted based on the number of print pages of unprocessed print jobs registered in a corresponding printer; and
   said printer step includes the step of selecting said at least one printer for printing based on the print wait time.

20. A method as claimed in claim 18, wherein:
   the print processing information further includes a printer state representing a characteristic of a corresponding printer; and
   the method further comprises the step of determining whether or not the print contents match the printer state, and said printer selecting step is only executed when a match occurs.

21. A print data generation method as claimed in claim 18, further comprising the step of:
   displaying summary information describing a characteristic of the selected printer.

22. A method for controlling a network of printers to print specified print contents, said method comprising the steps of:
   transmitting a temporary print request to a plurality of printers;
   receiving acceptance information from each of the printers;
   requesting print processing information, indicating a print processing state of each printer based on the acceptance information;
   receiving the print processing information from each printer;
   selecting at least one of said printers for printing based on the print processing information input; and
   generating, based on the print contents, print data for printing by said selected printer,
   wherein print data generation does not precede printer selection.

23. A method as claimed in claim 22, wherein:
   the print processing information contains at least the number of print pages of unprocessed print jobs registered in the corresponding printer; and
   said printer selecting step includes the steps of:
   predicting print wait time in each of said printers to which the temporary print request has been sent, based on the number of print pages of unprocessed print jobs registered in each printer; and
   selecting at least one printer for printing based on the print wait time.

24. A method as claimed in claim 22, wherein:
   the print processing information contains at least the print wait time predicted based on the number of print pages of unprocessed print jobs registered in the corresponding printer; and
   said printer selecting step includes the step of selecting said at least one printer for printing based on the print wait time.

25. The print data generation method as claimed in claim 23, wherein:
   the print processing information further includes a printer state representing a characteristic of a corresponding printer; and
   the method further comprises the step of whether or not the printer contents match the printer state, said printer selecting step is only executed when a match occurs.

26. The print data generation method as claimed in claim 23, further comprising the step of:
   displaying summary information describing a characteristic of the selected printer.

27. A print data generation system for generating print data, based on specific print contents, for printing by at least one of a plurality of printers in a printer network, said system comprising:
   a temporary print request transmitter which transmits a temporary print request to a particular printer;
   a print processing information request element which requests print processing information indicating a print processing state of the printer, including at least the total number of print pages of unprocessed print jobs to be printed which are registered in the printer, based on acceptance information provided from the printer indicating receipt of the temporary print request by the printer;
   a selector which selects the printer based on the print processing information; and
   a print data generator which generates the print data for printing by the printer selected by said selector, wherein
   said temporary print request transmitter transmits the temporary print request to a plurality of said printers; and
   said selector selects at least one of said printers based on the print processing information input from each of the printers;
   the print processing information contains at least the number of print pages of unprocessed print jobs registered in a corresponding printer; and
   said selector predicts print wait time in each of said printers to which the temporary print request was sent based on the number of print pages of unprocessed print jobs registered in each said printer, and selects at least one of said printers for printing based on the print wait time wherein:

print wait time WT is predicted as $$WT = (PN/PS) + (CSN/JN) * TC$$

where JN is the total number of unprocessed print jobs registered in each printer, PN is the total number of print pages of the unprocessed print jobs, CSN is the number of context switch times, PS is printing speed of each printer, and TC is the change time required for context switch.

* * * * *